United States Patent [19]

Hinkel

[11] Patent Number: 5,704,456
[45] Date of Patent: Jan. 6, 1998

[54] HYDRODYNAMIC TORQUE CONVERTER

[75] Inventor: Rüdiger Hinkel, Eichenweg, Germany

[73] Assignee: Fichtel & Sachs AG, Schweinfurt, Germany

[21] Appl. No.: 616,804

[22] Filed: Mar. 15, 1996

[30] Foreign Application Priority Data

Mar. 16, 1995 [DE] Germany .................. 195 09 501.4

[51] Int. Cl.[6] .................................................. F16H 45/02
[52] U.S. Cl. .......................... 192/3.29; 192/113.32; 60/345
[58] Field of Search .......................... 192/3.21, 3.23, 192/3.25, 3.28, 3.29, 3.3, 3.34, 113.32; 60/333, 341, 345, 346, 362

[56] References Cited

U.S. PATENT DOCUMENTS

| 2,462,652 | 2/1949 | Lysholm | 60/341 |
| 2,548,207 | 4/1951 | Dunn | 192/3.29 X |
| 2,717,673 | 9/1955 | Zeidler | 192/3.3 |
| 2,815,684 | 12/1957 | Roche | 192/3.3 X |

FOREIGN PATENT DOCUMENTS 3447940  11/1985  Germany .

Primary Examiner—Richard M. Lorence
Attorney, Agent, or Firm—Nils H. Ljungman and Associates

[57] ABSTRACT

In a hydrodynamic torque converter, a secondary circulation which is provided for the cooling of the hydraulic fluid in the primary circulation chamber, and when there is a lockup clutch also for the actuation of this lockup clutch, runs through a stator support structure which comprises an over-running clutch unit. One or more passage channels are provided in the locking rings of the overrunning clutch unit which provide the flow path through the stator support structure.

20 Claims, 6 Drawing Sheets

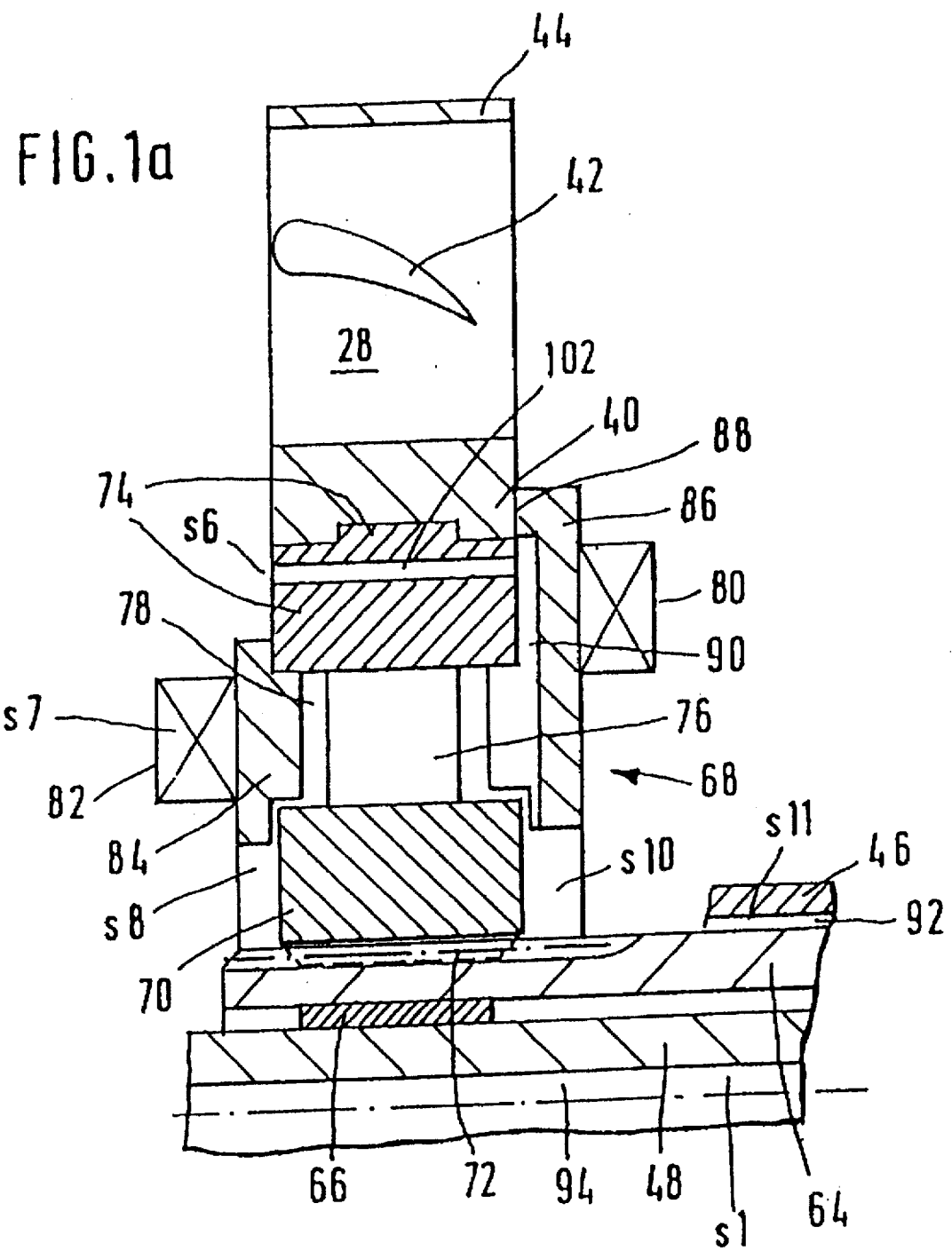

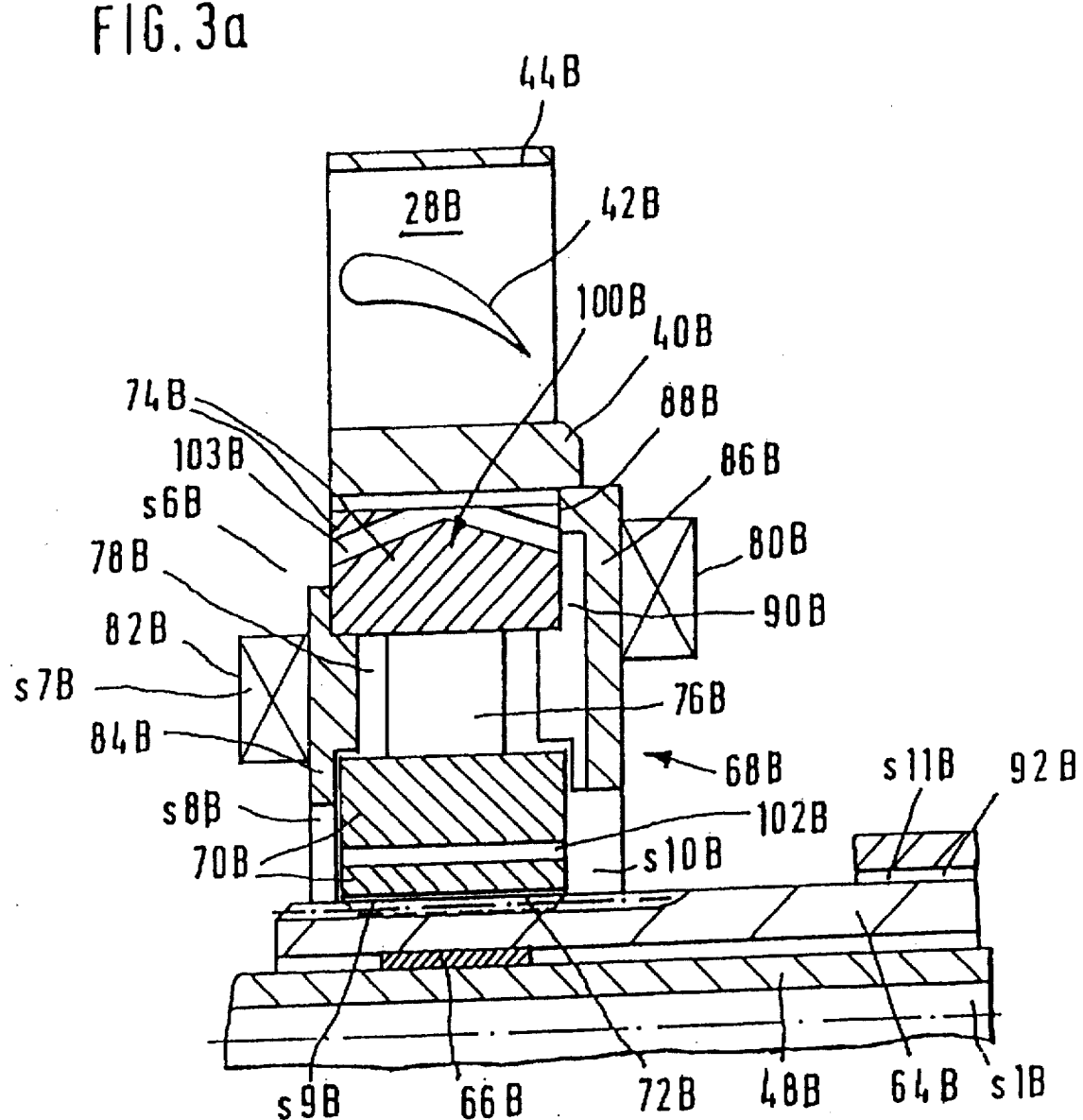

HYDRODYNAMIC TORQUE CONVERTER

BACKGROUND OF THE INVENTION

1. Field of the invention

This invention relates to a hydrodynamic torque converter in the drive train between a drive source and a driven component, comprising:

an impeller, a turbine, and a stator, which are located so that they can rotate relative to one another around a joint axis of rotation and are axially supported with respect to one another by axial support means, whereby the impeller, which is closer to the driven component, the turbine, which is farther from the driven component, and the stator, which is located axially between the impeller and the turbine close to the axis inside a hydraulic chamber, define a toroidal primary circulation chamber, and inside the toroidal primary circulation chamber have impeller blades, turbine blades and stator blades respectively, whereby, in addition, the impeller is in a driven connection with the drive source, whereby, in addition, the turbine can he connected to the driven component by means of a connecting shaft which is surrounded by the stator and the impeller, whereby, in addition, the stator can be supported on a support tube which surrounds the connecting shaft by means of an overrunning clutch unit to prevent rotation in a direction of rotation around the axis of rotation, whereby, in addition the overrunning clutch unit has an inner locking ring which is in a torque-transmitting connection with the support tube, an outer locking ring which is in torque-transmitting connection with a stator hub, and locking bodies which are located radially between the inner locking ring and the outer locking ring, so that between the stator hub and the support tube, a radial stator support structure is formed which includes the overrunning clutch unit, whereby, in addition, the hydraulic chamber contains a hydraulic fluid which is used for torque transmission inside the toroidal primary circulation chamber, whereby, in addition—if desired—there is a hydraulically actuated lockup clutch in a torque transmission path between the turbine and the impeller, whereby, in addition, there is a secondary circulation of the hydraulic fluid which is used to cool the hydraulic fluid, and to actuate the lockup clutch, if any, which secondary cooling circulation is connected to an external hydraulic fluid recirculation station by means of flow paths which run partly along the connecting shaft, and whereby this secondary circulation comprises a segment which runs through the stator support structure.

2. Background Information

A similar hydrodynamic torque converter of the prior art is disclosed in German Patent No. 34 47 940.

In this embodiment, the segment of the secondary circulation which runs through the stator support structure runs through an annular space between the outer locking ring and the inner locking ring and holds the locking bodies, and a turbine-side support and cover plate which is axially supported by means of the turbine-side axial bearing on a hub of the turbine.

Also disclosed are embodiments in which the segment runs inside the support tube.

Different types of construction of the torque converter require different paths for the flow of the hydraulic fluid of the secondary circuit.

An additional relevant publication is European Patent specification 0 125 428 A1.

OBJECT OF THE INVENTION

The object of the invention is to produce paths through the stator support structure which make it possible, by means of adaptations to different constructions of the torque converter, to constructively facilitate the guidance of the hydraulic fluid and create cross sections of the flow path which make possible, on one hand, a rapid response of the lockup clutch, and on the other hand, a sufficient cooling flow of the hydraulic fluid.

SUMMARY OF THE INVENTION

The invention teaches that this object can be accomplished if the segment through the stator support structure is formed at least partly by at least one passage channel which runs through the material of the outer locking ring and/or of the inner locking ring.

One particular advantage of the path of the passage channel claimed by the invention is that the routing of the hydraulic fluid of the secondary circulation through the space between the inner locking ring and the outer locking ring can be eliminated. It has also been determined that when the hydraulic fluid of the secondary circulation is routed through this space, the response behavior of the locking bodies can be adversely affected, so that when there is a change from a condition where the stator is driven to a condition where the stator is stationary, the locking bodies make an uncontrolled and delayed transition into the locking state.

In other words, when the hydraulic fluid of secondary circulation is routed through the space between the inner locking ring and outer locking ring, the overrunning or freewheeling clutch is slower to respond. Because of the passage channel in an embodiment of the invention, this routing of hydraulic fluid between the inner locking body and the outer locking body is eliminated and locking bodies interlock more rapidly, thus speeding up response of the overrunning clutch.

Further, for the overrunning clutch to redirect the hydraulic fluid, the overrunning clutch should arrive at a stationary position. If the outer locking body does not stop rotating with respect to the inner locking body, the overrunning clutch remains in a freewheeling, spinning state. In its freewheeling state, the overrunning clutch cannot readily redirect the hydraulic fluid properly.

As such, one advantage of the path of the passage channel in an embodiment of the invention is that by allowing the hydraulic fluid to avoid a path between the inner locking body and the outer locking body, the locking bodies can interlock more quickly, allowing the overrunning clutch to quickly arrive at a stationary position, so as to redirect the hydraulic fluid towards the impeller.

The passage channels are preferably distributed in a ring-like manner over he respective locking ring or the locking rings, so that the individual passage channels can be realized so that they have a small cross section, and thus the structural strength remains intact in the vicinity of the passage channels, without having to significantly increase the radial size of the locking rings.

If a passage channel runs through the radially outer locking ring, the radially outer locking ring can emerge into the toroidal primary circulation chamber radially outside an axial bearing which is located between the outer locking ring and the turbine.

The turbine-side axial bearing can thereby be supported on the radially outer locking ring by a support and cover ring which essentially covers the space between the outer locking ring and the inner locking ring. The support and cover ring should thereby be able to rotate freely with respect to the radially inner locking ring, so that it does not interfere with the freewheel action.

To create the flow path of the secondary circulation between the axial area and the impeller-side mouth of the passage channel in the outer locking ring, it is possible to have the passage channel of the outer locking ring emerge on the impeller-side into a system of radial channels which is realize between an impeller-side cover and support plate and which is supported on the stator hub and/or on the outer locking ring, whereby the impeller-side axial bearing is located between this cover plate and support plate and the impeller. This cover and support plate, in addition to the above-mentioned cover and support ring on the turbine side, can protect the space between the two locking rings from the effects of circulation, so that the hydraulic fluid essentially does not exert any uncontrollable effect on the locking bodies.

The means described above make it possible to realize the impeller-side axial bearing so that it is essentially hydraulically tight, without adversely affecting the flow through the stator support structure. In this manner it is possible to prevent the suction of hydraulic fluid of the secondary circuit in the primary circulation chamber via the impeller-side axial bearing.

The passage channel of the radially outer locking ring can be connected by the system of radial channels on the impeller side to a corresponding circulation path which runs along the connecting shaft and the support tube.

The flow through the space between the two locking rings—as indicated above—can be blocked or cut off. The blocking or cutoff can thereby be selected so that only the very small amount of hydraulic fluid required for lubrication of the locking bodies gets into the space, without the locking action of the locking bodies being affected, or in particular their response to the blocking or cutoff caused by the actuation of the overrunning clutch unit.

In the event of a passage channel which runs through the radially inner locking ring, the impeller-side mouth of the passage channel can lie radially inside the impeller-side axial bearing, and the turbine-side mouth of the passage channel can lie radially inside the turbine-side axial bearing.

Even with such a solution, which can be used in combination with a system of one or more additional passage channels in the radially outer locking ring, it is possible that the impeller-side axial bearing can be essentially impermeable to fluid in the radial direction, while only the turbine-side axial bearing is fluid-permeable.

As before, even when there are one or more passage channels in the radially inner locking ring, the space located between the radially outer locking ring and the radially inner locking ring can be essentially cut off from the flow of fluid.

Parallel to the one or more passage channels in the inner locking ring and/or in the outer locking ring, there can also be an additional parallel path through the torque transmission means between the radially inner locking ring and the support tube. This parallel path has of course also been used in similar systems of the prior art, but it has been determined that this parallel path is by itself not always sufficient for the secondary circulation, on one hand to guarantee a rapid response of the lockup clutch, and on the other hand to guarantee an effective removal of heat from the torque converter.

The impeller-side opening of the at least one passage channel can be connected, for example, to a flow path which is realized between the support tube and a tube extension of the impeller which projects in the direction of the driven component.

The hydrodynamic torque converter is controlled, for example, so that the flow path realized between the support tube and the tubular extension of the impeller can be pressurized for the actuation of the lockup clutch. On the other hand, a flow path which runs inside the connecting shaft can be pressurized to open the lockup clutch and to maintain the secondary circulation.

It should also be noted that in a series of torque converter constructions, basically the space between the connecting shaft and the support pipe is available as a flow path, which can be routed so that it runs parallel to the flow path between the support tube and the tubular extension of the impeller, or can be routed so that it runs parallel to the hole in the connecting shaft. On the other hand, it may also be necessary to provide an additional radial bearing between the support tube and the connecting shaft in the vicinity of the stator support structure, e.g. in the form of a bearing shell made of non-ferrous metal. In that case, the annular space between the support tube and the connecting shaft is only available to a limited extent, or not at all, as a circulation path, and the arrangement in accordance with the invention of one or more passage channels in one or the other of the locking rings can be particularly helpful precisely in such embodiments.

The configuration of the hydrodynamic torque converter in accordance with the invention is of particular interest, even in those converter constructions in which the lockup clutch can be operated in a sliding manner by pressure regulation, whereby energy is dissipated from the lockup clutch in the form of the heat generated by friction and can be discharged via the secondary circulation.

The elimination of the flow of hydraulic fluid through the space between the two locking rings also means that axial forces on the locking bodies between the locking rings can be avoided by an appropriate selection of the cross sections, so that the danger of pressing the locking bodies against the impeller-side cover and support plate, which entails the risk of friction and wear, can be prevented.

One aspect of the invention resides broadly in a hydrodynamic torque converter with a lockup clutch, such as for a motor vehicle, the torque converter comprising: a power output shaft; a pump wheel, the pump wheel comprising: a pump wall; the pump wall comprising a first inner portion; the first inner portion for being disposed substantially adjacent to the power output shaft; a plurality of blades; the pump wheel being connected to a source for providing power; a turbine wheel, the turbine wheel comprising: a turbine wall; the turbine wall comprising a second inner portion; the second inner portion for being disposed adjacent to the power output shaft; a plurality of blades; the plurality of blades of the pump wheel and the plurality of blades of the turbine wheel being disposed to face one another; the turbine wheel being disposed adjacent to the pump wheel; the turbine wheel being connected to and for driving the output shaft; stator means, the stator means being disposed between the turbine wheel and the pump wheel; the stator means comprising an overrunning clutch unit; the overrunning clutch unit comprising an inner locking ring and an outer locking ring; the outer locking ring being disposed about the inner locking ring; a lockup clutch for locking together the turbine and the pump to prevent movement of the turbine and the pump with respect to one another upon engagement of the lockup clutch; means for circulating hydraulic fluid; the means for circulating hydraulic fluid comprising at least one passage channel for permitting the flow of hydraulic fluid through at least one of the outer locking ring and the inner locking ring; the means for circulating hydraulic fluid being disposed substantially adjacent to the output shaft; the means for circulating hydraulic fluid comprising a flow path; the flow path comprising a portion which runs through the at least one passage channel; means for cooling hydraulic fluid; the means for circulating hydraulic fluid being connected to the means for cooling hydraulic fluid; the means for circulating hydraulic fluid being disposed to assist in actuating the lockup clutch.

Another aspect of the invention resides broadly in a hydrodynamic torque converter with a lockup clutch, such as for a motor vehicle, the torque converter comprising: a power output shaft; a pump wheel, the pump wheel comprising: a pump wall; the pump wall comprising a first inner portion; the first inner portion for being disposed substantially adjacent to the power output shaft; a plurality of blades; the pump wheel being connected to a source for providing power; a turbine wheel, the turbine wheel comprising: a turbine wall; the turbine wall comprising a second inner portion; the second inner portion for being disposed adjacent to the power output shaft; a plurality of blades; the plurality of blades of the pump wheel and the plurality of blades of the turbine wheel being disposed to face one another; the turbine wheel being disposed adjacent to the pump wheel; the turbine wheel being connected to and for driving the output shaft; stator means, the stator means being disposed between the turbine wheel and the pump wheel; the stator means comprising an overrunning clutch unit; the overrunning clutch unit comprising an inner locking ring and an outer locking ring; the outer locking ring being disposed about the inner locking ring.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not include more than one patentably and non-obviously distinct invention, and maintains that this application may include more than one patentably and non-obviously distinct invention. The applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The accompanying figures illustrate embodiments of the invention which are also explained in greater detail below.

FIGS. 1a, 2a and 3a show enlarged partial cross sections of FIGS. 1-3.

DESCRIPTION OF THE PREFERRED EMBODIMENTS

Figure 1:
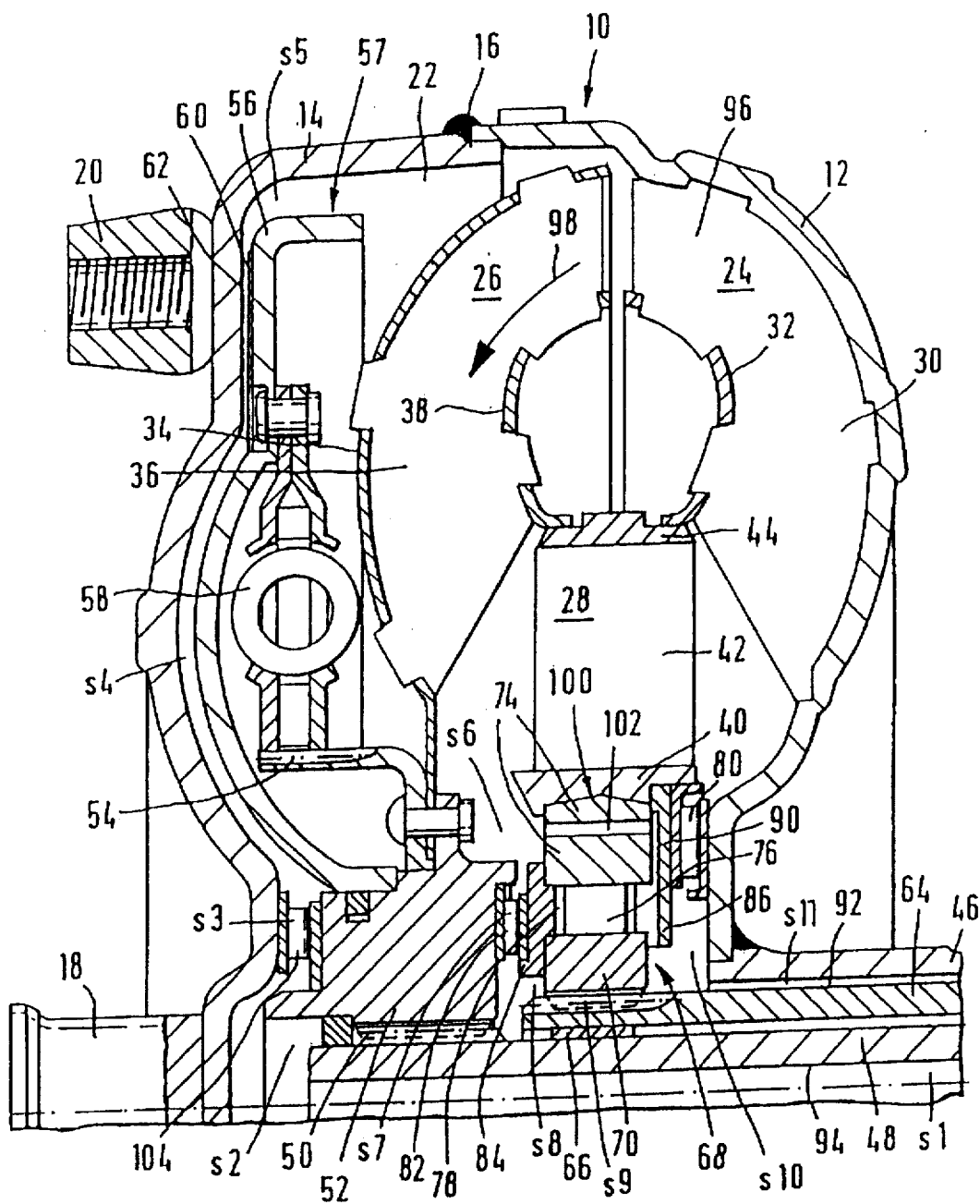
FIGS. 1, 2 and 3 show axial cross sections through different embodiments of the invention.

FIG. 1 shows a converter housing which is designated 10 in general, and which is composed of two parts 12 and 14. These two parts 12 and 14 are tightly connected to one another, e.g. by means of welding 16. The converter housing 14 is welded to a shaft butt end 18, which is designed to be inserted into a bearing hole on the facing end of a crankshaft of an internal combustion engine. There are also threaded bushings 20 on the converter housing part 14 for connection with the flywheel which, for its part, can be attached to the crankshaft (not shown). The converter housing 10 encloses a hydraulic chamber 22. Inside this hydraulic chamber 22 there are an impeller 24, a turbine 26 and a stator 28. The impeller 24 is formed by the converter housing part 12, impeller blades 30 and an inside wall 32 of the ring; the turbine wall 26 is formed by an outside wall 34 of the ring, turbine blades 36 and an inside wall 38 of the ring. The stator 28 is formed by a stator hub 40, stator blades 42 and an inside wall 44 of the ring. The impeller 24 is mounted rotationally on one hand by means of the shaft butt end 18 in the crankshaft (not shown), and on the other hand by means of a tubular extension 46 on a stationary component, e.g. on the transmission housing of a transmission which is located downstream of the converter. Inside the converter housing 10, a connecting shaft 48 is rotationally mounted by means of its left end (not shown) in FIG. 1 in the converter housing 10, and connecting shaft 48 enters with its right end (not shown) into the transmission, to drive the transmission's input shaft or input gear wheel. A turbine hub 52 is rotationally mounted on the connecting shaft 48 by means of a gearing pair 50, which turbine hub 52 supports the turbine 26 by means of the outer wall 34 of the ring, and turbine hub 52 is axially supported by means of an axial bearing 104 on the converter housing part 14. A clutch plate guide 54 is riveted to the turbine hub 52, and a clutch plate 56 with a torsion damper 58 is movably guided on the clutch plate guide 54. The clutch plate 56 is realized with a friction lining 60 which is designed so that it comes into a frictional engagement with a friction surface 62 of the housing part 14.

Between the tubular extension 46 of the impeller 24 and the connecting shaft 48 there is a support tube 64 which is non-rotationally supported on the transmission housing (not shown), and support tube 64 contributes by means of an additional bearing shell 66 to the mounting of the connecting shaft 48. The stator hub 40 is supported by means of an overrunning clutch unit 68 on the support tube 64. The overrunning clutch unit 68 comprises a radially inner locking ring 70, which is non-rotationally supported by means of a gearing pair 72 (see FIG. 1a) on the support tube 64, plus an outer locking ring 74 which is cast into the stator hub 40, and locking bodies 76 in the space 78 between the two locking rings 70 and 74.

The stator hub 40 is supported on the side toward the impeller 24 by an impeller-side axial bearing 80, and on the side toward the turbine hub 52 by a turbine-side axial bearing 82.

In FIG. 1a, which shows the overrunning clutch unit 68 on an enlarged scale, the two axial bearings 80 and 82 are illustrated only schematically. Fastened to the outer locking ring 74 is a support and cover ring 84, with which the axial bearing 82 is engaged. The support and cover ring 84 has some radial play with respect to the inner locking ring 70. Fastened to the impeller side on the outer locking ring 74 is a support and cover plate 86 which is also in contact with the stator hub 40 at 88, and has play with respect to the inner locking ring 70. The impeller-side axial bearing 80 is in contact against the impeller side of the support and cover plate 86, while a channel system 90 which runs essentially radially is realized on the stator side of the support and cover plate 86.

An annular space 92 between the support tube 64 and the tubular extension 46 of the impeller 24 represents a segment of a circulation path which is connected by means of switch valve means to a recirculation station of a secondary circulation which is realized in the form of a gear pump. A second circulation path segment 94 which carries the flow in the opposite direction of annular space 92, is realized inside the connecting shaft 48, e.g. in the form of a central hole. Referring back to FIG. 1, the hydraulic chamber 22 is filled with hydraulic fluid, which also fills a toroidal annular space 96 in the vicinity of the blades 30 of the impeller 24, turbine 26 and stator 28. The hydraulic fluid inside the toroidal annular space 96 is used to transmit the torque from the impeller 24 to the turbine 26, and thus to transmit the torque from the crankshaft of the internal combustion engine located upstream to the transmission which is connected to the connecting shaft 48.

In the range of low speeds of rotation, the lockup clutch 57 is open, whereby slip occurs between the impeller 24 and the turbine 26, and there is a loss of heat in the primary circuit 98 of the hydraulic fluid inside the toroidal annular space 96.

The stator hub 40 and the overrunning clutch unit 68 form a stator support structure 100. The radially outer locking ring 74 is penetrated by a plurality of passage channels 102 distributed over the periphery. An additional fluid passage is formed by the stator support structure 100 in the vicinity of the gearing pair 72.

In the range of low speeds of rotation, the circulation path segment 94 of the secondary circuit is connected to the pressure side of the recirculation station (not shown), e.g. of a gear pump when the lockup clutch 57 is to be opened. The hydraulic fluid thereby follows the flow path s1-s2-s3-s4-s5 into the hydraulic chamber 22 and can flow back to the low pressure side of the recirculation station via the path s6-s7-s8-s9-s10-s11. In addition, between s6 and s10 (see FIG. 1a in particular), there is a branch path via the passage channels 102 and the system 90 of radial channels. Only a small pressure decrease occurs in this branch path s6-102-90-s10. There is essentially no flow through the intermediate chamber 78, and the intermediate chamber 78 is in virtually all cases lubricated with small quantities of the hydraulic fluid. The impeller-side axial bearing 80 essentially cuts off the flow completely, so that no flowthrough occurs there, either. The large flowthrough cross section, in particular on the path s6-102-90-s10, makes possible a strong flow in the secondary circulation, and thus a continuous cooling of the hydraulic fluid in the primary circulation 98. As a result of the above flow, the lockup clutch 57 remains open.

If the lockup clutch 57 is to be closed, then the annular space 92 is connected to the pressure side of the recirculation station by means of switching measures in valves of the recirculation station. Then the pressure of the hydraulic fluid travels on the path s11-s10-s9-s8-s7-s6 and via the bypass s10-90-102-s6 to the clutch plate 56. The flow on this path continues, for example, until, as a result of pressure on the right-hand side of the clutch plate 56, the lockup clutch 57 comes into contact with the friction surface 62. The pressure on the clutch plate 56 can build up very rapidly due to the bypass s10-90-102-s6.

Since the passage of fluid is essentially cut off by the axial bearing 80, essentially no hydraulic fluid can be sucked out of the secondary circulation via the axial bearing 80 during recirculation of hydraulic fluid in the primary circuit 98 by the impeller 24.

Figure 2:
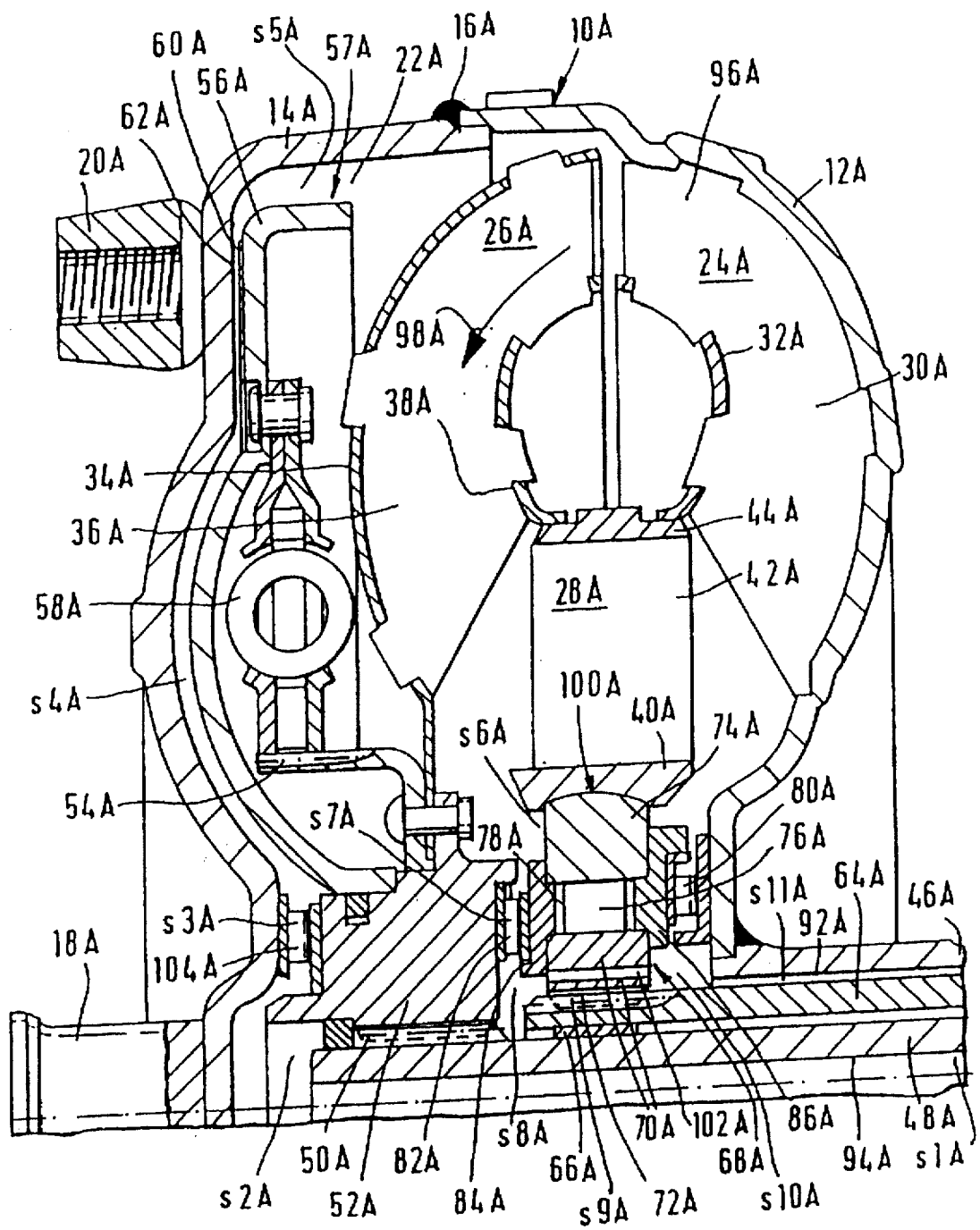
Figure 2A:
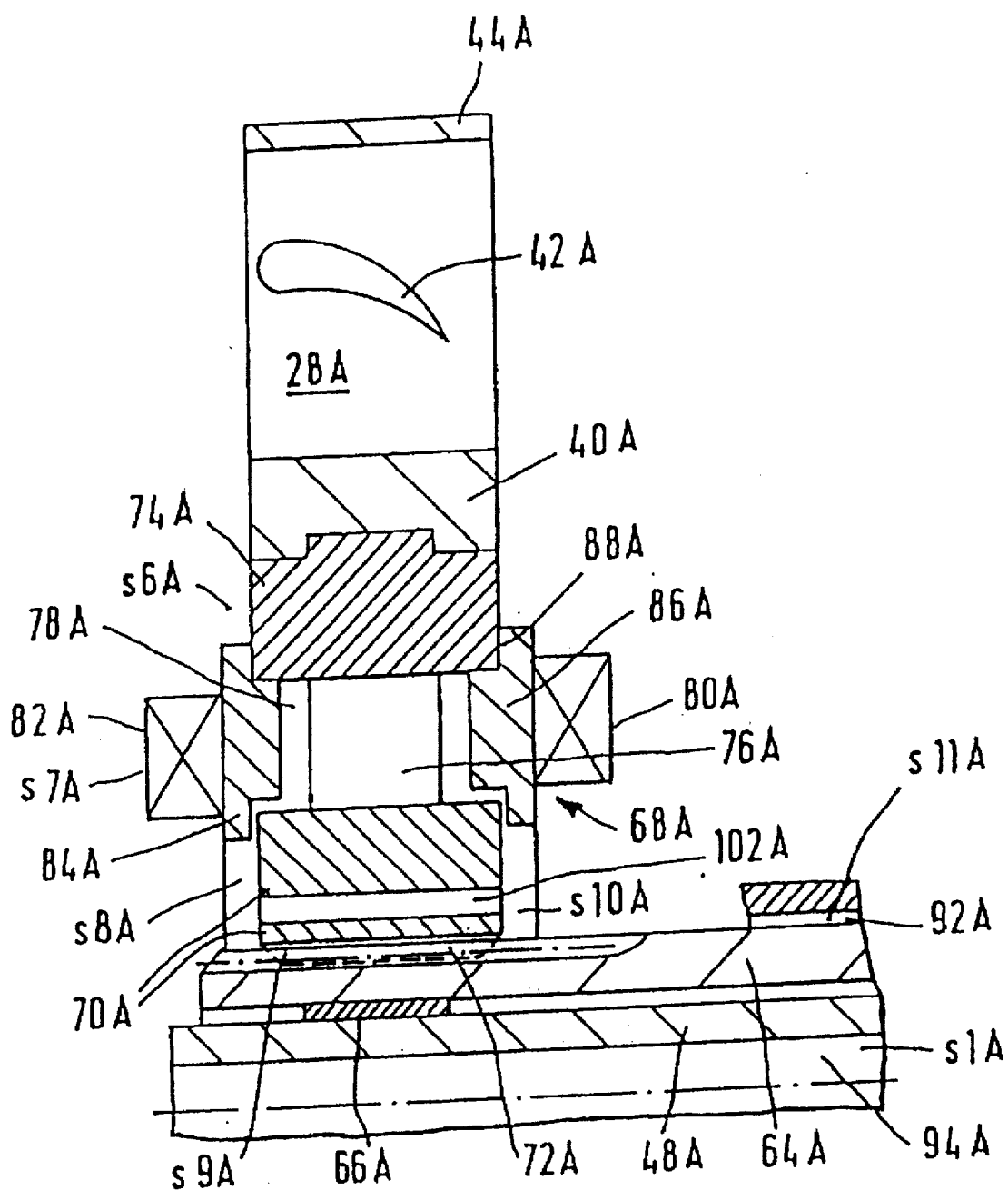

FIGS. 2 and 2a illustrate a variant of the embodiment illustrated in FIG. 1. Analogous parts are identified by the same reference numbers as those used in FIG. 1, but with the addition of the index A.

The only difference from the embodiment illustrated in FIG. 1 is in the vicinity of the overrunning clutch unit 68A, for which reference is made to FIG. 2a.

In the embodiment illustrated in FIGS. 2 and 2a, the radially inner locking ring 70A is penetrated by a plurality of passage channels 102A which are distributed over the periphery. In addition, in FIGS. 2 and 2a there is an additional fluid passage which runs through the stator structure 100A in the vicinity of the gearing pair 72A. The location of the turbine-side axial bearing 82A and of the support and cover ring 84A is the same as in FIGS. 1 and 1a.

In accordance with one embodiment, the fluid passage which extends through the stator structure 100A can be indicated by reference number s9A.

On the impeller side, a support and cover plate 86A is fastened to the radially outer locking ring 74A and has some play with respect to the radially inner locking ring 70A. The impeller-side axial bearing 80A is in contact with the impeller side of the support and cover plate 86A. A flow of the hydraulic fluid through the intermediate space 78A between the two locking rings 70A and 74A is essentially prevented by the turbine-side support and cover ring 84A and by the impeller-side support and cover plate 86A.

In the embodiment illustrated in FIGS. 2 and 2a, in the range of low speeds of rotation, when the lockup clutch 57A is to be opened, the circulation path segment 94A of the secondary circulation is also connected with the pressure side of the recirculation station (not shown). The hydraulic fluid thereby takes the flow path s1A-s2A-s3A-s4A-s5A into the hydraulic chamber 22A, and can flow back via the path s6A-s7A-s8A-s9A-s10A-s11A and also via the bypass s6A-s7A-102A-s10A-s11A to the low pressure side of the recirculation station.

The impeller-side axial bearing 80A essentially blocks flow, so that hydraulic fluid from the secondary flow path cannot be sucked via the axial bearing 80A into the primary circuit 98A.

To close the lockup clutch 57A, switching measures are performed in the recirculation station to connect the annular space 92A with the pressure side of the recirculation station. The pressure of the recirculation station is then applied via the path s11A-s10A-s9A-s8A-s7A-s6A and simultaneously via the bypass 10A-102A-s8A-s7A-s6A to the right-hand side of the clutch disc 56A. The rest of the sequence corresponds to that of the embodiment illustrated in FIGS. 1 and 1a, and is therefore not explained in any greater detail here.

Figure 3:
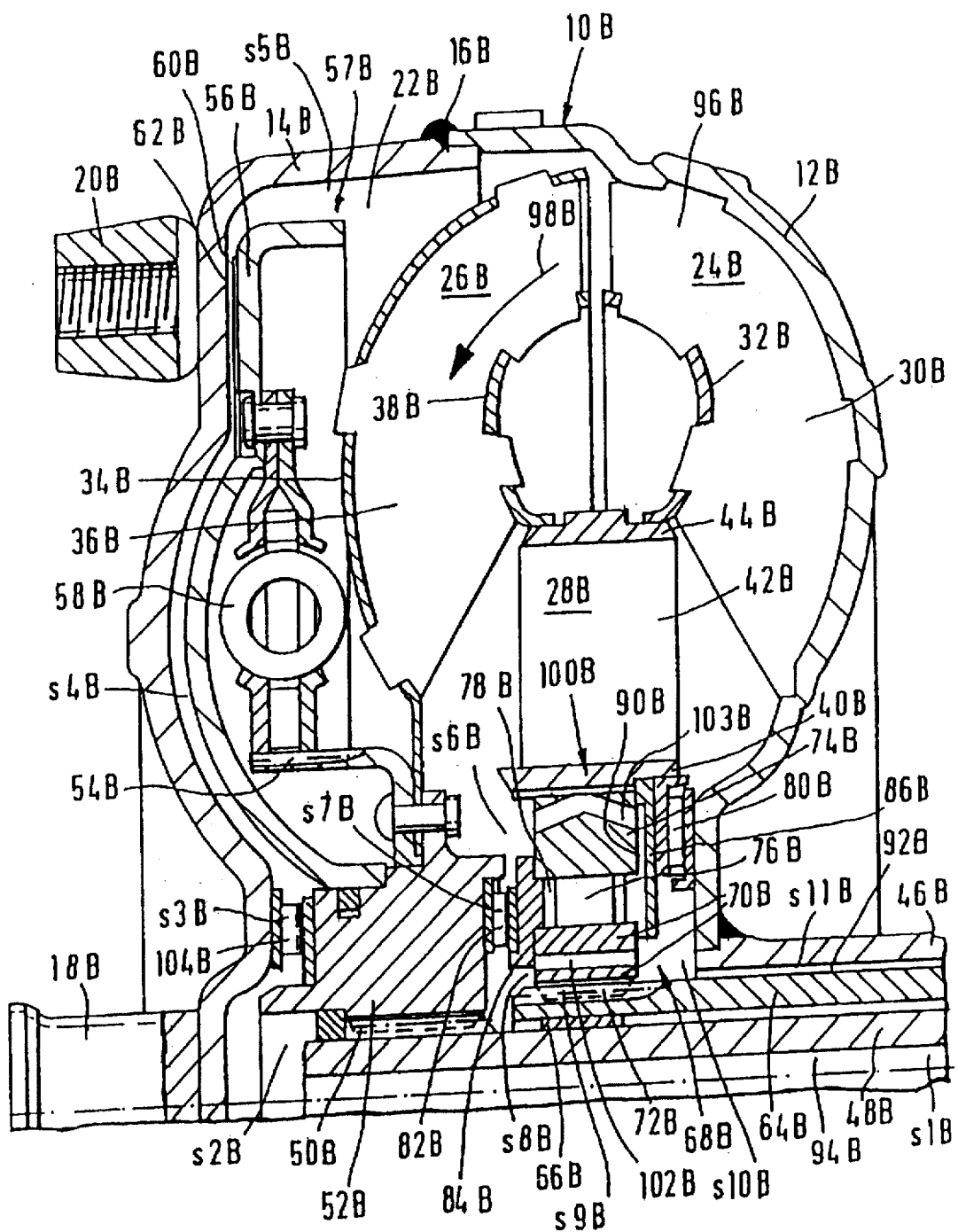

FIGS. 3 and 3a illustrate an additional variant of the embodiment illustrated in FIG. 1, but also have the passage channels 102B corresponding to 102A in FIGS. 2 and 2a. Analogous parts are also identified by the same reference numbers as in FIGS. 1 and 1a, but with the addition of the index B.

The passage channel through the locking ring 74B in this case is designated 103B and cuts in a roof-shaped manner the connection between the stator hub 40B and the outer locking ring 74B.

The secondary circulation thereby runs under essentially all operating conditions through the stator support structure 100B over a total of three paths, namely:
Path s10B-s9B-s8B-s7B-s6B
Path s10B-102B-s8B-s7B-s6B
Path s10B-90B-103B-s6B
and in the reverse direction.

One feature of the invention resides broadly in the hydrodynamic torque converter in the drive train between a drive source and a driven component, comprising: an impeller 24, a turbine 26, and a stator 28, which are located so that they can rotate relative to one another around a joint axis of rotation and are axially supported with respect to one another by axial support means 80, 82, 104, whereby the impeller 24, which is closer to the driven component, the turbine 26, which is farther from the driven component and the stator 28, which is located axially between the impeller 24 and the turbine 26, which is close to the axis inside a hydraulic chamber 22, define a toroidal primary circulation chamber 96, and inside the toroidal primary circulation chamber 96 have impeller blades 30, turbine blades 36 and stator blades 42 respectively, whereby, in addition, the impeller 24 is in a driven connection with the drive source, whereby, in addition, the turbine 26 can be connected to the driven component by means of a connecting shaft 48 which is surrounded by the stator 28 and the impeller 24, whereby, in addition, the stator 28 can be supported on a support tube 64 which surrounds the connecting shaft 48 by means of an overrunning clutch unit 68 to prevent rotation in a direction of rotation around the axis of rotation, whereby, in addition, the overrunning clutch unit 68 has an inner locking ring 70 which is in a torque-transmitting connection with the support tube 64, an outer locking ring 74 which is in torque-transmitting connection with a stator hub 40, and locking bodies 76 which are located radially between the inner locking ring 70 and the outer locking ring 74, so that between the stator hub 40 and the support tube 64, a radial stator support structure 100 is formed which includes the overrunning clutch unit 68, whereby, in addition, the hydraulic chamber 22 contains a hydraulic fluid which is used for torque transmission inside the toroidal primary circulation chamber 96, whereby, in addition—if desired—there is a hydraulically actuated lockup clutch 57 in a torque transmission path 54–62 between the turbine 26 and the impeller 24, whereby, in addition, there is a secondary circulation s1–s11 of the hydraulic fluid which is used to cool the hydraulic fluid, and to actuate the lockup clutch 57 if any, which secondary cooling circuit is connected to an external hydraulic fluid recirculation station by means of flow paths 92, 94 which run partly along the connecting shaft 48, and whereby this secondary circulation s1–s11 comprises a segment s6–s10 which runs through the stator support structure 100, characterized by the fact that the segment s6–s10 is formed at least partly by at least one passage channel 102 which runs through the outer locking ring 74 and/or the inner locking ring 70.

Another feature of the invention resides broadly in the torque converter characterized by the fact that a passage channel 102 through the radially outer locking ring 74 emerges into the toroidal primary circulation chamber radially outside an axial bearing 82 which is located between the outer locking ring 74 and the turbine 26.

Yet another feature of the invention resides broadly in the torque converter characterized by the fact that the turbine-side axial bearing 82 is supported on the radially outer locking ring 74 by a support and cover ring 84 which essentially covers the space 78 between the outer locking ring 74 and the inner locking ring 70.

Still another feature of the invention resides broadly in the torque converter characterized by the fact that the passage channel 102 through the outer locking ring 74 emerges on the impeller side into a radial channel system 90 which is formed between an impeller-side cover and support plate 86 and supported on the stator hub 40 and/or on the outer locking ring 74, whereby the impeller-side axial bearing 80 is located between this cover plate and support plate and the impeller 24.

A further feature of the invention resides broadly in the torque converter characterized by the fact that the impeller-side axial bearing 80 blocks a connection between a corresponding flow path 92 and the toroidal primary circulation chamber 96.

Another feature of the invention resides broadly in the torque converter characterized by the fact that the flow through the space 78 between the two locking rings 70, 74 is, essentially, completely cut off.

In other words, when the hydraulic fluid of secondary circulation is routed through the space between inner locking ring 70 and outer locking ring 74, the overrunning or freewheeling clutch 68 is slower to respond. Because of the passage channel in an embodiment of the invention, this routing of hydraulic fluid between locking bodies 70 and 74 is eliminated and locking bodies 70 and 74 interlock more rapidly, thus speeding up response of the overrunning clutch 68.

Further, for the overrunning clutch 68 to redirect the hydraulic fluid, overrunning clutch 68 should arrive at a stationary position. If outer locking body 74 does not stop rotating with respect to inner locking body 70, the overrunning clutch 68 remains in a freewheeling, spinning state. In its freewheeling state, the overrunning clutch 68 cannot readily redirect the hydraulic fluid properly.

So one advantage of the path of the passage channel in an embodiment of the invention is that by allowing the hydraulic fluid to avoid a path between locking bodies 74 and 70, the locking bodies 74 and 70 can interlock more quickly, allowing the overrunning clutch 68 to quickly arrive at a stationary position, permitting the stator 28 to redirect the hydraulic fluid towards the impeller.

To reiterate how a torque converter works, a torque converter multiplies the force of the engine. The impeller 24, or pump, directs hydraulic fluid against the blades 36 of the turbine 26. The turbine 26 then directs the hydraulic fluid against the blades 42 of the stator 28, which should be in a stationary position for torque multiplication. When the stator 28 is in a stationary position, the overrunning clutch 68 is engaged. When the overrunning clutch 68 is engaged, the stator 28 can then redirect the hydraulic fluid appropriately.

Yet another feature of the invention resides broadly in the torque converter characterized by the fact that in the case of a passage channel 102A which runs through the radially inner locking ring 70A, the impeller-side mouth of the passage channel 102A lies radially inside the impeller-side axial bearing 80A and that the turbine-side mouth of the passage channel 102A lies radially inside the turbine side axial bearing 82A.

Still another feature of the invention resides broadly in the torque converter characterized by the fact that the impeller-side axial bearing 80A is essentially impermeable to fluid in the radial direction.

A further feature of the invention resides broadly in the torque converter characterized by the fact that the turbine-side axial bearing 82A is fluid permeable.

Another feature of the invention resides broadly in the torque converter characterized by the fact that the space between the radially outer locking ring 74A and the radially inner locking ring 70A is essentially blocked for the flow of fluid.

Yet another feature of the invention resides broadly in the torque converter characterized by the fact that the at least one passage channel 102 is located in parallel to an additional flow 72, which is formed by torque transmission engagement means 72 between the support tube 64 and the inner locking ring 70 of the overrunning clutch unit 68.

Still another feature of the invention resides broadly in the torque converter characterized by the fact that the impeller-side mouth of the at least one passage channel 102 is connected to a flow path which is formed between the support tube 64 and a tubular extension 46 of the impeller 24 which projects toward the driven component.

A further feature of the invention resides broadly in the torque converter characterized by the fact that the flow path 92 which is formed between the support tube 64 and the tubular extension 46 of the impeller 24 can be pressurized for the actuation of the lockup clutch 57.

Another feature of the invention resides broadly in the torque converter characterized by the fact that a flow path 94 which runs inside the connecting shaft 48 can be pressurized to open the lockup clutch 57 and to maintain the secondary circulation s1–s11.

Examples of torque converters in which the embodiment of the present invention could possibly be used may be found in the following documents: U.S. patent application Ser. No. 08/263,772 filed on Jun. 22, 1994 entitled "HYDROKINETIC TORQUE CONVERTER WITH LOCK-UP CLUTCH" having inventors Jurgen DEMGENSKY, Wilfried GLOCK, Horst JADICKE, Josef RIEDMANN, Bernd SCHODER, Friedrich SCHRAMM, and Johannes SOSSNITZA, which corresponds to Federal Republic of Germany patent applications No. P 43 20 768.5, filed on Jun. 23, 1993, and No. P 44 16 263.4, filed on May 7, 1994, which correspond to DE-OS 43 20 768.5 and DE-OS 44 16 263.4 and DE-PS 43 20 768.5 and DE-PS 44 16 263.4, respectively, which may have other equivalent or corresponding applications in the Federal Republic of Germany and elsewhere; U.S. patent application Ser. No. 08/263,995 filed on Jun. 22, 1994 entitled "HYDROKINETIC TORQUE CONVERTER" having inventors Jurgen DEGENSKY, Wilfried GLOCK, Horst JADICKE, Josef RIEDMANN, and Bernd SCHODER, which corresponds to Federal Republic of Germany patent application No. P 43 20 769.3, which corresponds to DE-OS 43 20 769.3 and DE-PS 43 20 769.3 which may have other equivalent or corresponding applications in the Federal Republic of Germany and elsewhere; U.S. patent application Ser. No. 08/358,852 filed on Dec. 19, 1994 entitled "HYDROKINETIC TORQUE CONVERTER WITH LOCKUP CLUTCH" having inventors Uwe DEHRMANN, Ruthard KNOBLACH, Wolfgang KUNDERMANN, Herbert SCHMID, Peter VOLLAND, and Hans Wilhelm WIENEHOLT, which corresponds to Federal Republic of Germany patent applications No. P 44 23 640.9 filed on Jul. 6, 1994, and No. P 43 43 804.0, filed on Dec. 22, 1993, which correspond to DE-OS 44 23 640.9 and DE-OS 43 43 804.0, and DE-PS 44 23 640.9 and DE-PS 43 43 804.0, respectively, which may have other equivalent or corresponding applications in the Federal Republic of Germany and elsewhere; U.S. patent application Ser. No. 08/436,108 filed on May 8, 1995 entitled "HYDRODYNAMIC TORQUE CONVERTER WITH LOCKUP CLUTCH" having inventors Uwe DEHRMANN, Peter VOLLAND, and Hans-Wilhelm WIENHOLT, which corresponds to Federal Republic of Germany patent application No. P 44 16 153.0 filed on May 9, 1994, which corresponds to DE-OS 44 16 153.0 and DE-PS 44 16 153.0, which may have other equivalent or corresponding applications in the Federal Republic of Germany and elsewhere; U.S. patent application Ser. No. 08/527,760 filed on Sep. 13, 1995 entitled "HYDRODYNAMIC TORQUE CONVERTER WITH LOCK-UP CLUTCH" having inventors Uwe DEHRMANN, Peter VOLLAND, and Hans-Wilhelm WIENHOLT, which corresponds to Federal Republic of Germany patent application No. P 44 32 624.6 filed on Sep. 14, 1994, which corresponds to DE-OS 44 32 624.6 and DE-PS 44 32 624.6, which may have other equivalent or corresponding applications in the Federal Republic of Germany and elsewhere; U.S. patent application Ser. No. 08/541,061 filed on Oct. 11, 1995 entitled "HYDRODYNAMIC TORQUE CONVERTER WITH LOCKUP CLUTCH" having inventor Hans Wilhelm WIENHOLT, which corresponds to Federal Republic of Germany patent applications No. P 195 08 855.7, filed on Mar. 11, 1995, and and No. P 44 36 276.5, filed on Oct. 11, 1994, which correspond to DE-OS 195 08 855.7 and DE-OS 44 36 276.5, and DE-PS 195 08 855.7 and DE-PS 44 36 276.5, respectively, which may have other equivalent or corresponding applications in the Federal Republic of Germany and elsewhere; and U.S. patent application 08/204,064 filed on Mar. 1, 1994 entitled "HYDROKINETIC LOCKUP TORQUE CONVERTER WITH LOCKUP CLUTCH" having inventor Joachim GIMMLER, which was issued Oct. 31, 1995, and which corresponds to Federal Republic of Germany patent application No. P 43 06 598.8, filed on Mar. 3, 1993, which corresponds to DE-OS 43 06 598.8 and DE-PS 43 06 598.8, which may have other equivalent or corresponding applications in the Federal Republic of Germany and elsewhere. These patent and patent applications and their corresponding published patent applications, as well as their published equivalents, and other equivalents or corresponding applications, if any, and the references disclosed in any of the documents, publications, patents, and published patent applications cited herein, are hereby incorporated by reference as if set forth in their entirety herein. All of the above U.S. patent documents are assigned to Fichtel & Sachs AG of the Federal Republic of Germany.

Types of torque converters and components therefor, which may be utilized in accordance with the embodiments of the present invention may be found in the following U.S. patents: No. 4,478,323 to Weissenberger on Oct. 23, 1984, entitled "Hydrodynamic Clutch with Torsional Vibration Damping"; No. 4,437,551 to Gimmler on Mar. 20, 1984, entitled "Hydrodynamic Torque Converter"; No. 5,065,853 to Fujimoto et al. on Nov. 19, 1991, entitled "Lockup Clutch of Torque Converter"; No. 4,468,989 to Rosen on Sep. 4, 1984, entitled "Power Transmission Mechanism with a Hydrokinetic Torque Converter Having a Lockup Clutch"; No. 4,382,496 to Yamamori et al. on May 10, 1983, entitled "Torque Converter with Lockup Clutch Unit"; and No. 4,071,125 to Jameson on Jan. 31, 1978, entitled "Power Transmission with Torque Converter Lockup Clutch".

Types of torque converters in which the present invention may be incorporated may be disclosed by the following patents: U.S. Pat. No. 4,263,822 to Harmon on Apr. 28, 1981, entitled "Multirange Transmissions"; U.S. Pat. No. 3,953,970 to Fuehrer et al. on May 4, 1976, entitled "Torque Converter Transmission"; U.S. Pat. No. 5,065,853 to Fujimoto et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; U.S. Pat. No. 4,071,125 to Jameson on Jan. 31, 1978, entitled "Power Transmission with Torque Converter Lockup Clutch".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 09 501.4, filed on Mar. 16, 1995, having inventor Rudiger Hinkel, and DE-OS 195 09 501.4 and DE-PS 195 09 501.4, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydrodynamic torque converter with a lockup clutch, said torque converter comprising:

an axis of rotation defining an axial direction;

a pump wheel, said pump wheel comprising:
  a pump wall;
  a plurality of blades;
  an arrangement for being connected to a source for providing power;
  a turbine wheel, said turbine wheel comprising:
  a turbine wall;
  a plurality of blades;
  an arrangement for being connected to a transmission shaft for transmitting power to the transmission shaft;

said plurality of blades of said pump wheel and said plurality of blades of said turbine wheel being disposed to face one another;

said turbine wheel being disposed adjacent to said pump wheel;

a lockup clutch for locking together said turbine wheel and said pump wheel to prevent movement of said turbine wheel and said pump wheel with respect to one another upon engagement of said lockup clutch;

stator, said stator being disposed between said turbine wheel and said pump wheel;

said stator comprising a plurality of blades;

said stator comprising an overrunning clutch unit;

said overrunning clutch unit comprising an inner locking ring and an outer locking ring;

said outer locking ring being disposed about said inner locking ring;

said inner locking ring having an inner circumference disposed toward the axis of rotation;

the inner circumference of said inner locking ring being disposed a substantial distance from the axis of rotation;

said inner locking ring comprising an inner surface disposed adjacent to the inner circumference of said inner locking ring;

said inner locking ring having an outer circumference disposed away from the axis of rotation;

said outer locking ring having an inner circumference disposed toward the axis of rotation;

the inner circumference of said outer locking ring being disposed a substantial distance from the axis of rotation;

said outer locking ring having an outer circumference disposed away from the axis of rotation;

an arrangement for permitting circulation of hydraulic fluid simultaneously into and out of said hydrodynamic torque converter during torque converting operation of said hydrodynamic torque converter;

said arrangement for permitting circulation of hydraulic fluid comprising a first portion of a flow path to feed hydraulic fluid to said hydrodynamic torque converter;

said arrangement for permitting circulation of hydraulic fluid comprising a second portion of said flow path to direct hydraulic fluid away from said hydrodynamic torque converter;

said first portion of said flow path being structurally distinct from said second portion of said flow path;

said arrangement for permitting circulation of hydraulic fluid comprising at least one passage channel;

said at least one passage channel being disposed in and through at least one of:
  said outer locking ring between the inner circumference of said outer locking ring and the outer circumference of said outer locking ring; and
  said inner locking ring between said inner surface of said inner locking ring and the outer circumference of said inner locking ring; and said at least one passage channel being disposed to carry hydraulic fluid within said at least one passage in the axial direction.

2. The torque converter as claimed in claim 1, wherein:

said torque converter comprises a toroidal chamber formed at least partially by said pump wheel, said turbine wheel, and said stator;

said arrangement for permitting circulation of hydraulic fluid comprises at least a portion of said toroidal chamber;

said at least one passage channel is disposed in said outer locking ring; and said at least one passage channel is disposed to emerge into said toroidal chamber.

3. The torque converter as claimed in claim 2, wherein:

said torque converter comprises an axial bearing disposed between said overrunning clutch unit and said turbine wheel; and said at least one passage channel is disposed to emerge into said toroidal chamber to bypass hydraulic fluid around said axial bearing.

4. The torque converter as claimed in claim 3, wherein:

said outer locking ring comprises an arrangement for supporting said axial bearing;

said axial bearing support arrangement comprises a turbine-side support and cover ring; and said turbine-side support and cover ring is configured and disposed to cover a space between said inner locking ring and said outer locking ring.

5. The torque converter as claimed in claim 4, wherein:

said torque converter comprises an additional axial bearing;

said additional axial bearing is disposed between said stator and said pump wheel;

said stator comprises an arrangement for supporting said additional axial bearing;

said additional axial bearing support arrangement comprises a pump-side support-and-cover plate;

said arrangement for permitting circulation of hydraulic fluid comprises a radial channel disposed between said pump-side support-and-cover plate and said overrunning clutch unit;

said at least one passage channel comprises a first end and a second end;

said first end emerges into said toroidal chamber; and said second end emerges into said radial channel.

6. The torque converter as claimed in claim 5, wherein said additional axial bearing comprises an arrangement for substantially preventing flow of hydraulic fluid therethrough to substantially prevent flow of hydraulic fluid to or from said toroidal chamber.

7. The torque converter as claimed in claim 6, wherein said overrunning clutch unit comprises an arrangement to substantially prevent flow of hydraulic fluid through the space between said inner locking ring and said outer locking ring.

8. The torque converter as claimed in claim 7, wherein:

said at least one passage channel comprises at least one inner passage channel disposed in and through said inner locking ring;

said at least one inner passage channel comprises a first end and a second end;

said first end of said at least one inner passage channel is disposed to emerge adjacent said turbine wheel; and said second end of said at least one inner passage channel is disposed to emerge adjacent said pump wheel.

9. The torque converter as claimed in claim 8, wherein said axial bearing comprises an arrangement for permitting flow of hydraulic fluid therethrough to permit flow of hydraulic fluid between said toroidal chamber and said first end of said at least one inner passage channel.

10. The torque converter as claimed in claim 9, wherein:

said arrangement for permitting circulation of hydraulic fluid is disposed to assist in actuating said lockup clutch;

said inner locking ring comprises an arrangement for being non-rotationally connected to a support member of a transmission;

said non-rotational connecting arrangement comprises an arrangement for forming a hydraulic fluid flow passage between said inner locking ring and the support member of a transmission, the fluid flow passage being disposed to permit hydraulic fluid to flow in parallel to said at least one passage channel;

said pump wheel comprises a tubular extension;

said tubular extension comprises an arrangement for forming a flow path disposed between the transmission support member and said tubular extension, the flow path between the transmission support member and said tubular extension being in fluid connection with said second end of said at least one inner passage channel;

said torque converter comprises an arrangement for activating said lockup clutch upon pressurization of the flow path between the transmission support member and said tubular extension; and said torque converter comprises an arrangement for deactivating said lockup clutch upon pressurization of a flow path disposed in the transmission shaft.

11. The torque converter as claimed in claim 1, wherein:

said torque converter comprises a toroidal chamber formed at least partially by said pump wheel, said turbine wheel, and said stator;

said at least one passage channel is disposed in said inner locking ring;

said at least one passage channel comprises a first end and a second end;

said first end of said at least one passage channel is disposed to emerge adjacent said turbine wheel;

said torque converter comprises an axial bearing disposed between said stator and said turbine wheel;

said axial bearing is disposed between said toroidal chamber and said first end of said at least one passage channel;

said second end of said at least one passage channel is disposed to emerge adjacent said pump wheel;

said torque converter comprises an additional axial bearing;

said additional axial bearing is disposed between said stator and said pump wheel; and said additional axial bearing is disposed between said toroidal chamber and said second end of said at least one passage channel.

12. The torque converter as claimed in claim 11, wherein said additional axial bearing comprises an arrangement for substantially preventing flow of hydraulic fluid therethrough to substantially prevent flow of hydraulic fluid to or from said toroidal chamber.

13. The torque converter as claimed in claim 12, wherein said axial bearing comprises an arrangement for permitting flow of hydraulic fluid therethrough to permit flow of hydraulic fluid between said toroidal chamber and said first end of said at least one passage channel.

14. The torque converter as claimed in claim 13, wherein said overrunning clutch unit comprises an arrangement to substantially prevent flow of hydraulic fluid through a space between said inner locking ring and said outer locking ring.

15. The torque converter as claimed in claim 14, wherein:

said inner locking ring comprises an arrangement for being non-rotationally connected to a support member of a transmission; and said non-rotational connecting arrangement comprises an arrangement for forming a hydraulic fluid flow passage between said inner locking ring and the support member of a transmission, the fluid flow passage being disposed to permit hydraulic fluid to flow in parallel to said at least one passage channel.

16. The torque converter as claimed in claim 15, wherein:

said pump wheel comprises a tubular extension; and said tubular extension comprises an arrangement for forming a flow path disposed between the transmission support member and said tubular extension, the flow path between the transmission support member and said tubular extension being in fluid connection with said second end of said at least one passage channel.

17. The torque converter as claimed in claim 16, wherein:

said torque converter comprises an arrangement for activating said lockup clutch upon pressurization of the flow path between the transmission support member and said tubular extension; and said torque converter comprises an arrangement for deactivating said lockup clutch upon pressurization of a flow path disposed in the transmission shaft.

18. A hydrodynamic torque converter, said torque converter comprising:

an axis of rotation defining an axial direction;

a pump wheel, said pump wheel comprising:

a pump wall;

a plurality of blades;

an arrangement for being connected to a source for providing power;

a turbine wheel, said turbine wheel comprising:

a turbine wall;

a plurality of blades;

an arrangement for being connected to a transmission shaft for transmitting power to the transmission shaft;

said plurality of blades of said pump wheel and said plurality of blades of said turbine wheel being disposed to face one another;

said turbine wheel being disposed adjacent to said pump wheel;

stator, said stator being disposed between said turbine wheel and said pump wheel;

said stator comprising a plurality of blades;

said stator comprising an overrunning clutch unit;

said overrunning clutch unit comprising an inner locking ring and an outer locking ring;

said outer locking ring being disposed about said inner locking ring;

said inner locking ring having an inner circumference disposed toward the axis of rotation;

the inner circumference of said inner locking ring being disposed a substantial distance from the axis of rotation;

said inner locking ring comprising an inner surface disposed adjacent to the inner circumference of said inner locking ring;

said inner locking ring having an outer circumference disposed away from the axis of rotation;

said outer locking ring having an inner circumference disposed toward the axis of rotation;

the inner circumference of said outer locking ring being disposed a substantial distance from the axis of rotation;

said outer locking ring having an outer circumference disposed away from the axis of rotation;

an arrangement for permitting circulation of hydraulic fluid simultaneously into and out of said hydrodynamic torque converter during torque converting operation of said hydrodynamic torque converter;

said arrangement for permitting circulation of hydraulic fluid comprising a first portion of a flow path to feed hydraulic fluid to said hydrodynamic torque converter;

said arrangement for permitting circulation of hydraulic fluid comprising a second portion of said flow path to direct hydraulic fluid away from said hydrodynamic torque converter;

said first portion of said flow path being structurally distinct from said second portion of said flow path;

said arrangement for permitting circulation of hydraulic fluid comprising at least one passage channel;

said at least one passage channel being disposed in and through at least one of:

said outer locking ring between the inner circumference of said outer locking ring and the outer circumference of said outer locking ring; and said inner locking ring between said inner surface of said inner locking ring and the outer circumference of said inner locking ring; and said at least one passage channel being disposed to carry hydraulic fluid within said at least one passage in the axial direction.

19. The torque converter as claimed in claim 18, wherein:

said torque converter comprises a toroidal chamber formed at least partially by said pump wheel, said turbine wheel, and said stator;

said arrangement for permitting circulation of hydraulic fluid comprises at least a portion of said toroidal chamber;

said at least one passage channel is disposed in and through said outer locking ring;

said at least one passage channel is disposed to emerge into said toroidal chamber;

said torque converter comprises an axial bearing disposed between said overrunning clutch unit and said turbine wheel;

said at least one passage channel is disposed to emerge into said toroidal chamber to bypass hydraulic fluid around said axial bearing;

said outer locking ring comprises an arrangement for supporting said axial bearing;

said axial bearing support arrangement comprises a turbine-side support and cover ring;

said turbine-side support and cover ring is configured and disposed to cover a space between said inner locking ring and said outer locking ring;

said torque converter comprises an additional axial bearing;

said additional axial bearing is disposed between said stator and said pump wheel;

said stator comprises an arrangement for supporting said additional axial bearing;

said additional axial bearing support arrangement comprises a pump-side support-and-cover plate;

said arrangement for permitting circulation of hydraulic fluid comprises a radial channel disposed between said pump-side support-and-cover plate and said overrunning clutch unit;

said at least one passage channel comprises a first end and a second end;

said first end emerges into said toroidal chamber;

said second end emerges into said radial channel;

said additional axial bearing comprises an arrangement for substantially preventing flow of hydraulic fluid therethrough to substantially prevent flow of hydraulic fluid to or from said toroidal chamber;

said overrunning clutch unit comprises an arrangement to substantially prevent flow of hydraulic fluid through the space between said inner locking ring and said outer locking ring;

said arrangement for permitting circulation of hydraulic fluid comprises at least one inner passage channel disposed in and through said inner locking ring;

said at least one inner passage channel comprises a first end and a second end;

said first end of said at least one inner passage channel is disposed to emerge adjacent said turbine wheel;

said second end of said at least one inner passage channel is disposed to emerge adjacent said pump wheel;

said axial bearing comprises an arrangement for permitting flow of hydraulic fluid therethrough to permit flow of hydraulic fluid between said toroidal chamber and said first end of said at least one inner passage channel;

said inner locking ring comprises an arrangement for being non-rotationally connected to a support member of a transmission;

said non-rotational connecting arrangement comprises an arrangement for forming a hydraulic fluid flow passage between said inner locking ring and the support member of a transmission, the fluid flow passage being disposed to permit hydraulic fluid to flow in parallel to said at least one passage channel;

said pump wheel comprises a tubular extension; and said tubular extension comprises an arrangement for forming a flow path disposed between the transmission support member and said tubular extension, the flow path between the transmission support member and said tubular extension being in fluid connection with said second end of said at least one passage channel.

20. A hydrodynamic torque converter with a lockup clutch, said torque converter comprising:

an axis of rotation defining an axial direction;

a pump wheel, said pump wheel comprising:
 a pump wall;
 a plurality of blades;
 an arrangement for being connected to a source for providing power;

a turbine wheel, said turbine wheel comprising:
 a turbine wall;
 a plurality of blades;
 an arrangement for being connected to a transmission shaft for transmitting power to the transmission shaft;

said plurality of blades of said pump wheel and said plurality of blades of said turbine wheel being disposed to face one another;

said turbine wheel being disposed adjacent to said pump wheel;

a stator, said stator being disposed between said turbine wheel and said pump wheel;

said stator comprising a plurality of blades;

said stator comprising an overrunning clutch unit;

said overrunning clutch unit comprising an inner locking ring and an outer locking ring;

said outer locking ring being disposed about said inner locking ring;

said inner locking ring having an inner circumference disposed toward the axis of rotation;

the inner circumference of said inner locking ring being disposed a substantial distance from the axis of rotation;

said inner locking ring comprising an inner surface disposed adjacent to the inner circumference of said inner locking ring;

said inner locking ring having an outer circumference disposed away from the axis of rotation;

said outer locking ring having an inner circumference disposed toward the axis of rotation;

the inner circumference of said outer locking ring being disposed a substantial distance from the axis of rotation;

said outer locking ring having an outer circumference disposed away from the axis of rotation;

an arrangement for permitting circulation of hydraulic fluid during torque converting operation of said hydrodynamic torque converter;

said arrangement for permitting circulation of hydraulic fluid comprising at least one passage channel;

said at least one passage channel being disposed in and through at least one of:
 said outer locking ring between the inner circumference of said outer locking ring and the outer circumference of said outer locking ring; and
 said inner locking ring between said inner surface of said inner locking ring and the outer circumference of said inner locking ring; and said at least one passage channel being disposed to carry hydraulic fluid within said at least one passage in the axial direction.

* * * * *

UNITED STATES PATENT AND TRADEMARK OFFICE
CERTIFICATE OF CORRECTION

PATENT NO.   :   5,704,456
DATED        :   January 6, 1998
INVENTOR(S)  :   Rüdiger HINKEL It is certified that error appears in the above-identified patent and that said Letters Patent is hereby corrected as shown below:

On the title page, item [75], after 'Hinkel', delete "Eichenweg," and insert --Röthlein,--.

In column 1, line 23, after 'can', delete "he" and insert --be--.

In column 3, line 13, before 'between', delete "realize" and insert --realized--.

In column 13, line 46, Claim 1, before the first occurrence of 'stator' insert --a--.

In column 17, line 16, Claim 18, before the first occurrence of 'stator' insert --a--.

Signed and Sealed this

Twenty-fifth Day of August, 1998

Attest:

BRUCE LEHMAN

*Attesting Officer*    *Commissioner of Patents and Trademarks*